United States Patent [19]

Shely et al.

[11] Patent Number: 4,640,479

[45] Date of Patent: Feb. 3, 1987

[54] STRAIN RELIEF GROMMET

[75] Inventors: William W. Shely, St. Charles; Peter M. Wells, Sycamore, both of Ill.

[73] Assignee: All States Inc., Chicago, Ill.

[21] Appl. No.: 723,007

[22] Filed: Apr. 16, 1985

Related U.S. Application Data

[63] Continuation of Ser. No. 462,312, Jan. 31, 1983, abandoned.

[51] Int. Cl.$^4$ ............................................. F16L 5/00
[52] U.S. Cl. .................................... 248/56; 248/74.3; 174/153 G
[58] Field of Search ...................... 248/56, 74.3, 74.2; 174/65 G, 152 G, 153 G

[56] References Cited

U.S. PATENT DOCUMENTS

| | | | |
|---|---|---|---|
| 2,945,085 | 7/1960 | Billups | 248/56 |
| 3,502,917 | 3/1970 | Bizoe | 174/153 G |
| 3,515,363 | 6/1970 | Fisher | 248/74 PB |
| 3,562,847 | 2/1971 | Jemison | 174/153 G |
| 3,584,888 | 6/1971 | Lott | 174/153 G |
| 3,588,011 | 6/1971 | Peres | 248/74 A |
| 3,689,014 | 9/1972 | Fink | 248/56 |
| 3,742,559 | 7/1973 | Punako | 248/74 PB |
| 3,749,818 | 7/1973 | Jemison | 248/56 |
| 3,889,909 | 6/1975 | Koscik | 248/56 |
| 4,287,644 | 9/1981 | Durand | 24/17 AP |
| 4,373,112 | 2/1983 | Mizuno | 248/56 |

Primary Examiner—Reinaldo P. Machado
Assistant Examiner—Alvin Chin-Shue
Attorney, Agent, or Firm—Laff, Whitesel, Conte & Saret

[57] ABSTRACT

A new and improved strain relief for a cord applying a closely controllable force squeezing together a split grommet surrounding the cord. More particularly, a cable tie may be wrapped around the split cylindrical grommet and pulled by a conventional cable tie gun which is set for establishing a predetermined cable tie tension. The tie pulls the split grommet together with precisely the force that is produced by that tension. Thus, any cord passing through the grommet receives a maximum stress which is set by that tension.

10 Claims, 9 Drawing Figures

STRAIN RELIEF GROMMET

This is a continuation of U.S. patent application, Ser. No. 06/462,312, filed Jan. 31, 1983 abandoned 5.23.85.

This invention relates to strain relief grommets, and more particularly, to grommets which may apply a controlled amount of compressive forces upon a cord, wire, or line, and especially, upon a power line used in electrical equipment.

Conventionally, electrical equipment has a power cord or line which extends from a chassis to a wall outlet. If the cord is not mechanically secured (called "strain relief") to the chassis, any forces pulling upon the line are transferred directly to the electrical components connected thereto. These forces would soon break the component or the connection thereto and make the circuit inoperative. Therefore, it is conventional to provide strain relief by mechanically tying the power cord or line to the chassis to transfer any mechanical pull upon the cord directly to the chassis.

The foregoing paragraph speaks of strain relief for electrical cords. Actually, there are many other cords that may utilize strain relief. For example, a clothes line may be attached to a bracket on a pole. Therefore, this disclosure is to be construed broadly enough to cover any and all strain relief on any comparable cords.

A widely used strain relief has two hard plastic piece parts which nest together and form a twisting path for the cord to pass through. This twisting path applies a mechanical stress to the cord; however, the two parts must be squeezed together very tightly in order to pass through a hole in a chassis. This uncontrolled and uncontrollable squeezing adds further stress to the wire. Therefore, there is sometimes a tendency for the wire to become damaged.

Accordingly, an object of the invention is to provide new and improved means for and methods of supplying strain relief whereby any stress placed upon the cord is closely controllable.

Another object of the invention is to provide a strain relief system which uses existing tools to supply a controlled stress.

In keeping with an aspect of the invention, these and other objects are provided by a strain relief device in the form of a split cylindrical grommet having a section through which a cord passes and about which a cable tie may be wrapped. A conventional cable tie gun may be set to pull the cable tie with a predetermined tension in order to pull the split grommet together with precisely that tension. Thus, any wire in the cord passing through the grommet receives no more than a maximum stress which is set by that tension in the cable tie.

A preferred embodiment of the invention is seen in the attached drawing, wherein.

Figure 1:
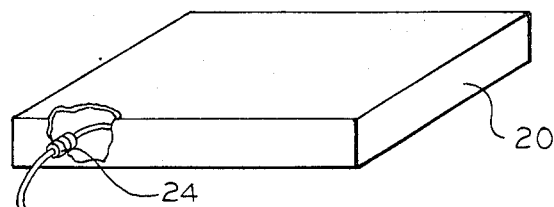
FIG. 1 is a perspective view of an electrical chassis with the inventive strain relief grommet in place.

FIG. 1 shows a chassis 20 which may represent any suitable device that requires strain relief. For example, the chassis 20 may be a sheet metal device which supports parts of a radio receiver powered via a conventional power cord or line 22. The power cord 22 is mechanically tied to the chassis 20 by the inventive strain relief grommet 24. Therefore, if the cord 22 is pulled, the sheet metal of chassis 20 receives the force and no stress is placed upon any components which are mounted on the chassis or connected to cord 22.

Figure 2:
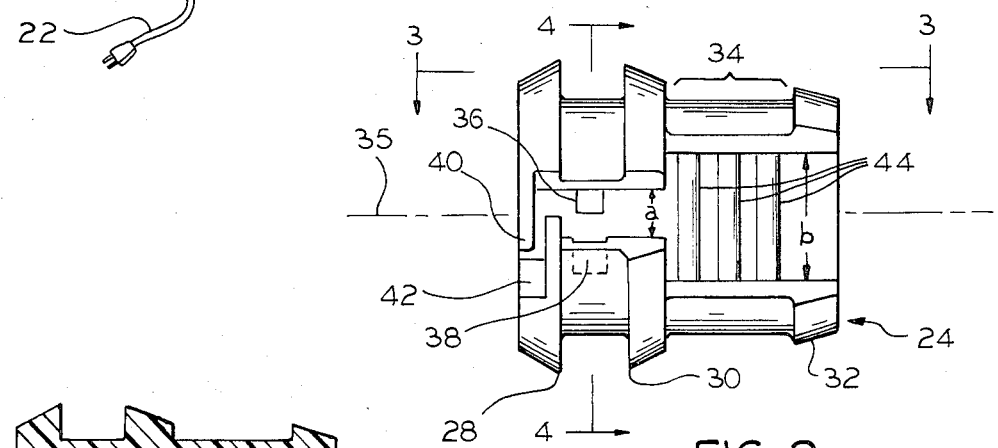
FIG. 2 is a side elevation of the inventive strain relief grommet in its relaxed state before it is either tensioned or inserted into the chassis.
Figure 3:
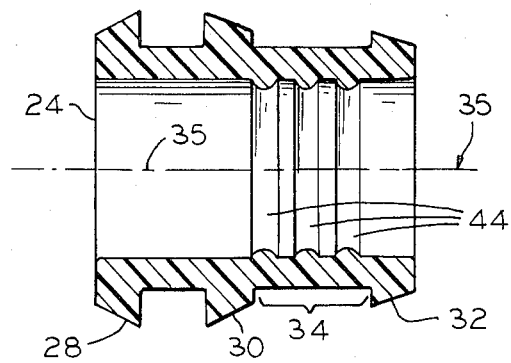
FIG. 3 is a cross section (taken along line 3—3, FIG. 2) of the inventive grommet taken in the plane of a cord passing through it.
Figure 4:
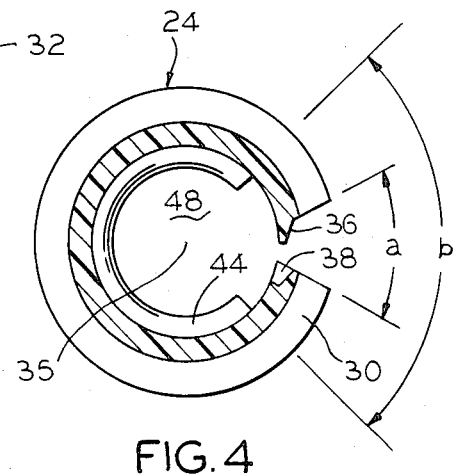
FIG. 4 is a cross section of the grommet (taken along line 4—4, FIG. 2) in a plane which is perpendicular to the section plane of FIG. 3.
Figure 5:
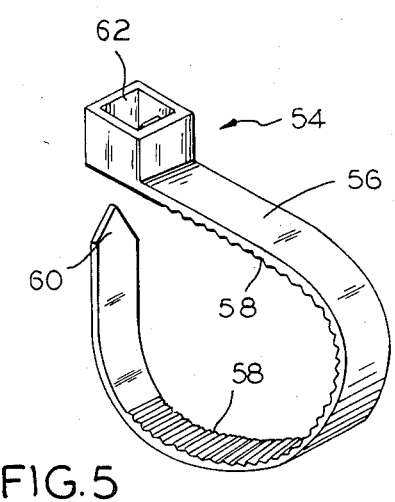
FIG. 5 is a perspective view of a part of a cable tie which is used to secure and apply a predetermined stress to the grommet.

The structure of the grommet is best seen in FIGS. 2–4. An end of split cylinder 24 may be pushed through a hole in chassis 20 where a pair of spaced parallel annular retaining rings 28, 30 receive and embrace the chassis metal. A third annular ring 32 is spaced away from the central annular ring 30 by a distance 34 which corresponds to the width of a preferred cable tie. Therefore, a cable tie (FIG. 5) may be wrapped around area 34 after which it may be drawn tightly around the cylinder.

An axial bore identified by dot-dashed line 35 (FIGS. 2, 3) receives a cord, wire, line, cable, rope, or other device which is to be given strain relief. A pair of tongues 36, 40 and grooves 38, 42 cooperate to align the two sides of the split cylinder, when the cable tie is drawn tightly.

Figure 6:
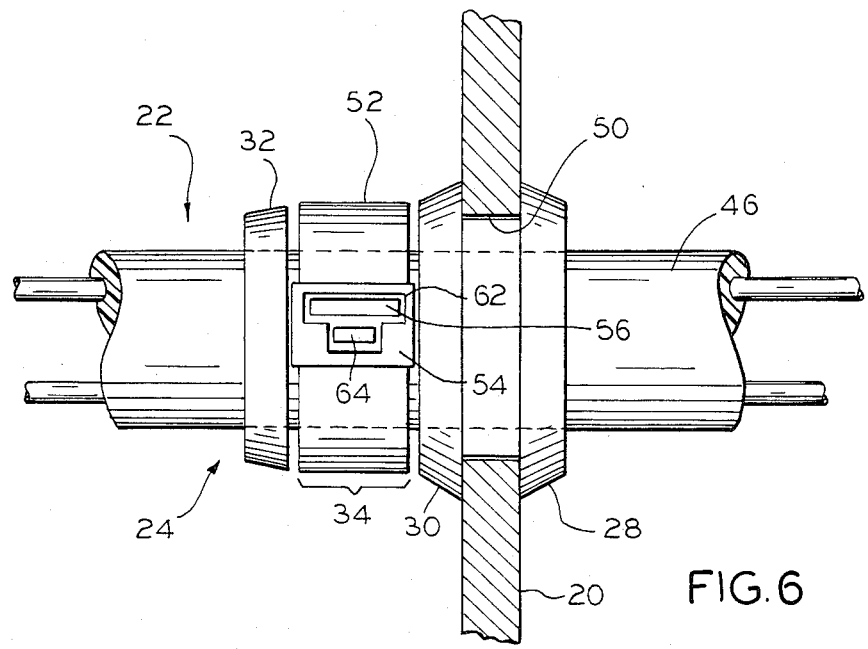
FIG. 6 is a side elevation which shows an inventive grommet in a chassis mounting hole with the cable tie securing a captured two wire cord in place.

Inside the bore 35, the split cylinder 24 has a plurality of internal annular ridges 44 which tend to be squeezed into the jacket 46 (FIG. 6) of a power line cord 22 and to hold it tightly. In the region of the chassis holding annular rings 28, 30, the open sector space between the edges of the split cylinder forms an angle "a" (FIG. 4) which may be in the order of about 30°. Normally, the cord 22 is threaded through the central opening 48 in the area of the space represented by angle "a".

In the area 34 where the cable tie is wrapped around the grommet, the cylinder has a 90° open sector "b". This sector provides ample room for easy insertion of the electric cord or line 22 into the bore of the grommet. Also, the sector "b" provides a substantial area for perimeter reduction so that the grommet may be reduced in diameter to squeeze the ridges 44 into the jacket of cord 22.

In operation, the cord 22 is placed in bore 35 of grommet 24, which is then pushed through a mounting hole 50 (FIG. 6) in chassis 20. The chassis is captured between annular rings 28, 30. Next, a cable tie 52 is placed around the space 34 and drawn tightly, to squeeze the cord 22 between the ridges 44 (FIGS. 2, 3).

A suitable cable tie is described in U.S. Pat. No. 3,605,199, and shown in FIG. 5. In general, a cable tie is an integral plastic piece part comprising a head 54 and a strap 56, which are somewhat similar to a belt with a buckle. The strap has a rack of transverse teeth 58 formed thereon. An end 60 of the strap is brought into alignment with and then pushed through an eye 62 in the head. As the strap end 60 emerges from the eye 62, it may be seized by a cable tie gun and pulled tightly into a locked position where a pawl 64 (FIG. 6) in eye 62 locks against a tooth in the rack of teeth 58. Then, the strap end is cut off close to the head 54. (Cable tie guns are quite well known devices which are the subject matter of International Class B21F 9/02; U.S. Class 140/123.6).

A conventional cable tie gun has an adjustable mechanism which may be set to exert a predetermined pull upon the strap 56, before the strap end is cut off. Thus, for example, the cable tie 52 may pull the section "b" (FIG. 4) toward a closed position with, say, a 30-pound pull. Therefore, no more than the amount of stress which is caused by a 30-pound pull may be placed on the wires as the internal ridges 44 are squeezed against the outer insulation of cord 22.

Figure 7:
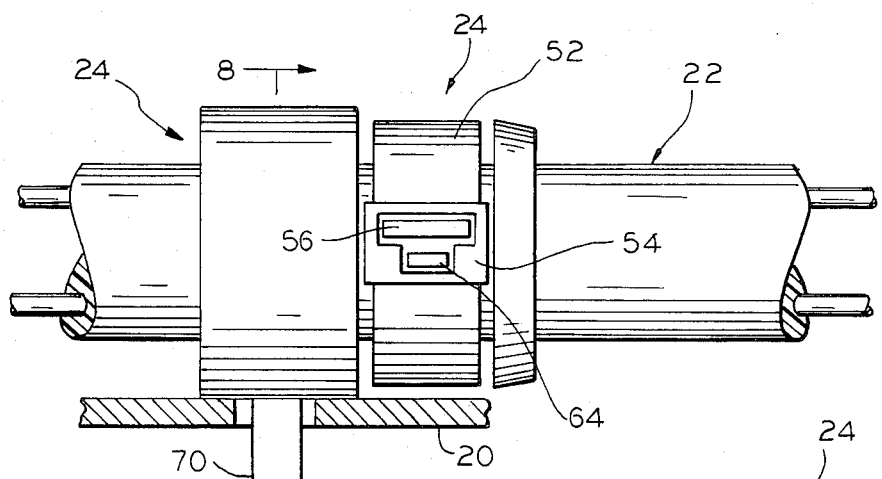
FIG. 7 is a side elevation which shows the inventive grommet, strain relief device of FIGS. 1–6 mounted on a push type of mounting base.
Figure 8:
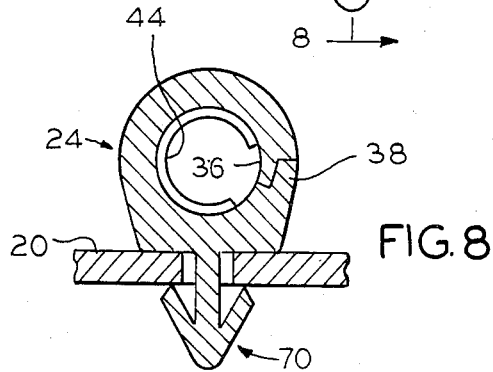
FIG. 8 is a cross section taken along line 8—8 of FIG. 7.
Figure 9:
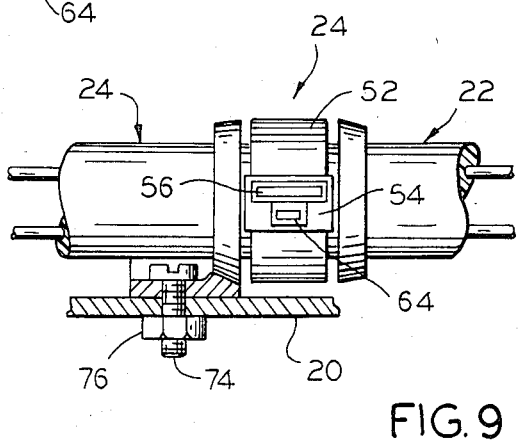
FIG. 9 shows a side elevation of an embodiment having a screw mount base.

The spaced parallel annular rings 28, 30 provide the preferred mode of mounting most strain relief grommets (i.e. push them through a hole far enough to position rings 28, 30 on opposite sides of the chassis 20). However, there are now many mounting devices for electronic components, such as the anchor base of U.S. Pat. No. 4,143,577 and no doubt many new anchor bases will be developed in the future. Any of these and similar mounting devices may also be used with the inventive grommet. For example, FIGS. 7 and 8 show a grommet 24 having a push mount 70 which may be pushed through a hole in a chassis in order to attach the grommet thereto. FIG. 9 shows an embodiment wherein the grommet is attached to the chassis 20 by means of a screw 74 and nut 76. Therefore, the term "mounting means" is to be construed broadly enough to cover all of these and equivalent devices.

Those who are skilled in the art will readily perceive how to modify the invention. Therefore, the appended claims are to be construed to cover all equivalent structures which fall within the true scope and spirit of the invention.

The claimed invention is:

1. A plastic strain relief eyelet device for protecting, insulating, and holding a cord passing through a perforation in a chassis against abrasion and axial forces exerted by pulling upon said cord; said strain relief device comprising a cylindrical ring with a C-shaped cross section having a single longitudinal open split sector along one side and having a substantially uniform internal diameter throughout forming a grommet, a spaced parallel pair of annular shoulder means formed on an outside surface of said C-shaped cylindrical ring for securely mounting said grommet in a perforation on a chassis by being pushed therethrough, one of said shoulder means being at a first end of said grommet; means formed on the outside perimeter surface of said cylinder at a location adjacent the other of said pair of shoulder means for securely receiving, retaining and positioning a cable tie which wraps around the circumference of the split cylinder, said longitudinal open split sector being smaller in the area of said spaced parallel annular shoulders than in the area of the cable tie, the means for receiving, retaining and positioning said cable tie being at an end of said grommet which is opposite said first end, the length of said cylinder being equal to the combined widths of said pair of annular shoulder means, a width approximately equal to a thickness of said chassis, and a width approximately equal to a width of said cable tie; internal ridges formed on an inside wall of said cylinder for applying a clamping pressure transverse to said axial force by pressing against a cord passing through said grommet with sufficient force to deform a jacket on said cord; and means responsive to an attachment and selective tensioning of said cable tie about the outside perimeter for drawing together said split grommet to squeeze said internal ridges into said cord and to apply a selected predetermined tension in said strap and therefore a selected clamping pressure upon said cord as it is captured by said internal ridges.

2. The strain relief device of claim 1 and tongue and groove means formed on said cylinder for aligning the sides of said cylinder in said split sector when said cylinder is squeezed as it is pushed through said perforation.

3. A plastic strain relief eyelet for protecting, insulating, and holding a cord associated with a chassis against abrasion and axial forces exerted by pulling upon said cord; said strain relief device comprising a cylindrical ring with a C-shaped cross section having a longitudinal open split sector extending longitudinally along one side, said ring having a substantially uniform internal diameter throughout for forming a strain relief eyelet grommet; a spaced parallel pair of shoulder means formed on the outside perimeter surface of said cylinder at a location near one end of said cylinder for securely receiving, retaining and positioning a cable tie which wraps around the circumference of the split cylinder, internal ridges formed on an inside wall of said cylinder at a location about which said cable tie wraps for applying a clamping pressure transverse to said axial force by pressing against a cord passing through said grommet with sufficient force to deform a jacket on said cord; means responsive to an attachment and selective tensioning of said cable tie about the outside perimeter for drawing together said split grommet to squeeze said internal ridges into said cord and to apply a selected predetermined tension in said strap and therefore a selected clamping pressure upon said cord as it is captured by said internal ridges, and a mounting means on the opposite end of said cylinder for mounting said cylinder on a perforation on said chassis, said mounting means comprising a push mount, said longitudinal open split sector being larger in the area of said spaced parallel pair of shoulder means than in the mounting area.

4. A plastic strain relief eyelet for protecting, insulating, and holding a cord associated with a chassis against abrasion and axial forces exerted by pulling upon said cord; said strain relief device comprising a cylindrical ring with a C-shaped cross section having a longitudinal split open sector extending longitudinally along one side, said ring having a substantially uniform internal diameter throughout for forming a strain relief eyelet grommet; a spaced parallel pair of shoulder means formed on the outside perimeter surface of said cylinder at a location near one end of said cylinder for securely receiving, retaining and positioning a cable tie which wraps around the circumference of the split cylinder, internal ridges formed on an inside wall of said cylinder at a location about which said cable tie wraps for applying a clamping pressure transverse to said axial force by pressing against a cord passing through said grommet with sufficient force to deform a jacket on said cord; means responsive to an attachment and selective tensioning of said cable tie about the outside perimeter for drawing together said split grommet to squeeze said internal ridges into said cord and to apply a selected predetermined tension in said strap and therefore a selected clamping pressure upon said cord as it is captured by said internal ridges, and a mounting means on the opposite end of said cylinder for mounting said cylinder on a perforation on said chassis, said mounting means comprising a screw for attaching said grommet to said chassis.

5. A process for providing a strain relief eyelet for resisting axial forces exerted by pulling on a cord passing through an aperture in a chassis, said process comprising the steps of:

a. forming a grommet in the form of an integral cylinder with a C-shaped cross section having a single longitudinally open split sector extending along one side and having two ends with an axial bore extending therethrough, internally directed annular ridges formed along a part of the inside walls of said axial bore for clamping said cord in directions transverse to said axial forces, the external surface of said cylinder beginning at a shoulder at one of said ends, followed by two annular grooves having widths approximately equal to the thicknesses of said chassis and the width of a cable tie, respectively, and ending at the other of said ends, said width equal to said cable tie being outside said part of the inside wall with said annular ridges, said longitudinally open split sector being smaller in the area of the groove having a width approximately equal to the thickness of said chassis than in the area of the other groove;

b. extending a cord through said axial bore, said cord having a jacket with an outside diameter approximately equal to the internal diameter of said bore whereby said ridges squeeze into said jacket for applying a clamping pressure thereto when said split cylinder is closed; and c. tensioning a cable tie strap surrounding said width equal to said cable tie for pulling said split cylinder grommet with a selected predetermined force, said predetermined force pressing said ridges against and distorting the surface of said cord jacket for clamping said cord with a force which is determined by the selected tension in said cable tie, whereby said clamping forces are selected when said cable tie strap is installed.

6. The process of claim 5 wherein said tensioning of step c. is accomplished by pulling the strap of said cable tie by a cable tie gun having an adjustable tension control.

7. A strain relief device for transferring axial forces exerted by pulling a cord, said transfer being from the cord to a chassis having a perforation through which said cord passes, said device comprising a ring shaped cylinder grommet having a C-shaped cross section and forming an eyelet with a single open split sector extending along a length thereof, a pair of abutment means formed on an outside surface and near one end of said cylinder for seating themselves on opposite sides of a perforation in a chassis when one end of said grommet is pushed through a mounting perforation in said chassis; said seating means holding said one end of said eyelet in said perforation for mounting said cylinder in said perforation to resist an axial force without thereby applying substantial clamping forces on said cord, and internal ribs on the other end of said ring shaped split cylinder, cable tie means positioned next to one of said abutment means for surrounding and closing the other end of said split cylinder to press said ribs inwardly to grip said cord, the C-shaped split cylinder grommet having a total length approximately equal to the combined widths of said pair of abutment means, a thickness of said chassis, and a width of said cable tie means, said open split sector being smaller in the area of said pair of abutment means than in the area of said cable tie means; and means for selectively applying a controllable amount of closing forces upon said other end whereby said ribs are pressed inwardly to grip said cord by a predetermined force.

8. A relatively short unitary plastic grommet in the form of an eyelet for giving strain relief to a cord at a point where said cord passes through a mounting hole in a chasses having a predetermined thickness, a cable tie having a predetermined width, said grommet comprising a cylinder with a C-shaped cross section and having a single longitudinal open split sector and further having a straight bore with a limited length substantially equal to said predetermined thickness, plus said predetermined width, plus the width of at least three annular spaced parallel ridges defining two circumferential grooves formed side-by-side on the external surface of said cylinder, a first of said circumferential grooves having a width substantially equal to said predetermined thickness, whereby said first groove receives and embraces the walls of said chassis which surround said hole, a second of said circumferential grooves having a width substantially equal to said predetermined width, said open split sector being smaller in the area of said first groove than in the area of said second groove, whereby said second groove receives and embraces a strap of said cable tie, and means responsive to a tensioning of said strap while in said second groove for closing said split cylinder around said cord, said split cylinder having an internal wall with a contour beneath said cable tie which takes a bite upon said cord when said strap is tensioned, said split cylinder further having a uniform radial resistance throughout its length to resist said closing of said split cylinder.

9. The grommet of claim 8 wherein the internal wall of said split cylinder which is beneath said cable tie has a number of annular ridges which deform a jacket of said cord when said cable tie is tensioned.

10. The grommet of claim 9 and at least one tongue on said split wall for aligning said cylinder when closed by the tension of said cable tie.

* * * * *